United States Patent [19]

Cipolla

[11] Patent Number: 5,455,707
[45] Date of Patent: Oct. 3, 1995

[54] APPARATUS AND METHOD FOR LIGHT BEAM MULTIPLEXING

[75] Inventor: John C. Cipolla, Trout Run, Pa.

[73] Assignee: Ion Laser Technology, Salt Lake City, Utah

[21] Appl. No.: 99,853

[22] Filed: Jul. 30, 1993

[51] Int. Cl.⁶ .................................................. G02B 26/08
[52] U.S. Cl. .......................... 359/199; 359/197; 359/198; 359/872
[58] Field of Search .................................... 359/196–199, 359/209–211, 212–214, 223–225, 871, 872, 876, 877, 115, 813–814, 819, 831, 833, 837, 881; 310/36–38

[56] References Cited

U.S. PATENT DOCUMENTS

| | | | |
|---|---|---|---|
| 4,383,328 | 5/1983 | Kurihara | 378/42 |
| 4,413,352 | 11/1983 | Nishio | 378/42 |
| 4,958,894 | 9/1990 | Khowles | 359/225 |
| 5,015,071 | 5/1991 | Richter et al. | 359/850 |

*Primary Examiner*—Loha Ben
*Assistant Examiner*—James Phan
*Attorney, Agent, or Firm*—Madson & Metcalf

[57] ABSTRACT

An apparatus and method for multiplexing a light beam such as a laser beam with one or more optical surfaces such as mirrors is taught. In one embodiment, the apparatus includes an electromagnet, an armature, and an optical device. The optical device is mounted on the armature. The armature and the electromagnet preferably form part of an electromagnetic relay, so that actuating the electromagnet creates an electromagnetic force which moves the armature from a rest position into a responsive position near the electromagnet, thereby moving the optical device into an active position wherein the optical device engages the light beam. In a presently preferred embodiment, the apparatus also includes a leaf spring which urges the armature, and hence the optical device, away from the electromagnet when the electromagnetic force is absent. According to the method of the present invention, the optical device engages the light beam at a substantially constant angle and at a substantially constant distance from the light beam's origin, thereby reducing or eliminating misdirection of the beam as the optical device travels between the active and passive positions.

15 Claims, 4 Drawing Sheets

APPARATUS AND METHOD FOR LIGHT BEAM MULTIPLEXING

FIELD OF THE INVENTION

The present invention relates to an apparatus and method for multiplexing a light beam, and more particularly to an apparatus and method for mounting an optical device on an electromagnetic relay for movement in and out of the light beam.

TECHNICAL BACKGROUND OF THE INVENTION

Laser beams and other light beams are used today in a wide variety of applications ranging from communications to dentistry. In the field of dentistry, for instance, one use of laser light is to cure or harden resins used as filling material in teeth. As used herein, "light beam" denotes not only a laser beam but also any beam of coherent light, collimated light, semi-collimated light, or high-intensity light.

Light beams are typically generated by specialized equipment which varies from one application to another. However, many light beam generators are subject to two major drawbacks. First, light beam generators often require a substantial investment. Laser generators, for instance, may require a substantial initial investment, and additional funds are often required to meet ongoing power, cooling, calibration, and maintenance needs.

Some conventional systems attempt to avoid the expenses associated with multiple laser generators by making the generator somewhat portable. In the field of dentistry, for instance, one use of laser light is to cure or harden the resins used as filling material in teeth. To permit the availability of laser light in multiple dental operatories, some conventional systems are designed to be moved on a cart or similar device from room to room.

However, such portable generators have drawbacks. First, significant amounts of time may be required to relocate the laser generator. Second, it is often inconvenient to have the generator in the operatory. Operatories have limited space, which is already in demand for use by other equipment and by patients and dental personnel. Laser generators may also produce undesirable heat. Finally, such portable generators may typically only be used by one person at a time.

Another drawback of light beam generators is that even if a generator is tailored to a specific application such as dentistry, further adjustments to the light beam are often needed to satisfy particular conditions. For instance, the light beam's geometry, spectral characteristics, or strength must often be altered after the beam emerges from the generator.

Light beams may be altered through the use of optical surfaces. An "optical surface" is a surface which reflects, refracts, diffracts, filters, polarizes, or performs some combination of these operations upon light. Familiar examples of optical surfaces include mirrors, lenses, filters, and gratings. Optical surfaces need not be planar, but particular accuracy considerations arise in connection with those that are, as explained below.

Multiplexing addresses both the high cost and the inflexibility of light beam generators. As used herein, "multiplexing" a light beam includes engaging the light beam with one or more optical surfaces. Thus, multiplexing may include any of the following operations singly or in combination: switching, splitting, filtering, polarizing, passing the beam through a lens, or other operations performed with optical surfaces.

Multiplexing is performed by moving at least one optical surface from a passive position, in which the optical surface does not intersect the light beam, to an active position, in which the optical surface intersects the light beam in a desired manner. Multiplexing may also include movement of one or more optical surfaces from active to passive positions. An optical surface which intersects the light beam is said to engage the light beam, regardless of whether the optical surface is in the active position.

Two forms of multiplexing which address the high cost of light beam generators involve switching or splitting the light beam between several users. Beam switching involves directing the entire light beam first to one user and then to another. Switching may be performed with a group of fully reflective mirrors, each of which is arranged to direct the light beam toward a different user if it engages the beam. Beam splitting, by contrast, involves providing discrete fractions of the beam to multiple users at substantially the same time. Splitting may be performed with partially reflective mirrors which direct a portion of the beam toward one user and permit the remainder of the beam to continue toward another user. With either switching or splitting, however, the light beam generated by a single generator is divided between multiple users, thereby lowering the cost per user.

Multiplexing addresses the inflexibility of light beam generators by permitting the selective processing of a light beam before the beam reaches its target. By interposing filters, lenses, and other optical surfaces between the generator and the target, the light beam may be suitably modified.

Thus, multiplexing is a central requirement of many light beam applications, both to reduce their cost and to maximize their effectiveness. A central requirement of multiplexing, in turn, is the ability to accurately and cost-effectively move an optical surface between active and passive positions relative to a light beam.

Although conventional multiplexing systems differ in their approach, many are quite complex. In particular, many known systems employ stepper motors, complicated mechanical linkages, sophisticated electronics, and other intricate components to position the optical surface. Such positioning mechanisms often drive up the cost of the multiplexing apparatus and may also reduce reliability.

Accurate multiplexing is generally necessary to ensure adequate performance. Accuracy is essential in applications using high power laser beams, because people or equipment may be injured by a misdirected beam. One important measure of accuracy is whether the optical surface has a steady and predictable active position. If the optical surface does not hold steady, the engaged light beam may be reflected improperly, or may not be properly focused. Similar problems may arise if the optical surface does not always arrive at a predictable active position in relation to the light beam. Conventional systems based on intricate components often fail to provide steady and predictable active positions when these components fall out of calibration or fail completely.

In addition, it is difficult to design "fail-safe" devices using the complex positioning mechanisms of known systems. A fail-safe device is one whose behavior upon power failure provides a reliable measure of safety. A fail-safe laser multiplexer, for instance, might be designed so that localized failure of power to a mirror positioning mechanism always disengages the mirror, thereby permitting the laser beam to be directed toward a known safe location pending appropriate steps by the user. Such a fail-safe laser multiplexer is difficult to design using only a stepper motor for mirror positioning because such motors often freeze in place when they lose power. Adding additional linkages to force disengagement may add considerably to the multiplexer's complexity and expense.

Another important measure of accuracy is whether the light beam is misdirected as the optical surface travels between the passive and active positions. Of course, the light beam generator may be turned off while the optical surface moves. In practice, however, the generator is often left on while the optical surface moves, so it becomes important for the optical surface to move in a way that reduces or eliminates misdirection of the engaged light beam.

A serious drawback of conventional designs is their inaccuracy while the optical surface moves between the passive and active positions. The drawback is perhaps most readily apparent in connection with planar optical surfaces such as mirrors, which are widely used.

For example, one conventional design employs a mirror mounted on a rotary stage. Even if the mirror forms the correct angle of incidence with the light beam in the engaged position, the rotary stage is inherently inaccurate because the angle between the rotating mirror and the light beam changes as the stage rotates in or out of the engaged position. Because the mirror engages the light beam while the stage is in motion, the changing angle between the mirror and the light beam misdirects the light beam.

Another conventional design, which employs a translation stage, has a similar inherent problem. In this design, the mirror is mounted at approximately a forty-five degree angle to the light beam, on a translation stage which moves linearly at right angles to the light beam. Unlike the rotary stage, the translation stage design ensures that the mirror always engages the light beam at the same angle of incidence (forty-five degrees) during the transition between the active and passive positions. However, the location within the light beam where the mirror hits the beam moves as the stage translates in or out of the active position. Because the mirror plane does not always "cut" the light beam at the same distance from the beam's origin, the beam is reflected inaccurately.

Thus, it would be an advancement in the art to provide a cost-effective and accurate apparatus and method for engaging and disengaging an optical surface with a light beam.

It would be a related advancement to provide such a multiplexing apparatus and method that does not rely on stepper motors, complicated mechanical linkages, sophisticated electronics, or other intricate components to position the optical surface.

It would also be an advancement in the art to provide an apparatus and method that does not misdirect the light beam during the transition between passive and active optical surface positions.

It would be a further advancement to provide a fail-safe apparatus and method that reliably positions the optical surface in a safe position in the event of a power failure.

Such an apparatus and method is disclosed and claimed herein.

SUMMARY OF THE INVENTION

The multiplexing apparatus of the present invention includes at least one optical selector which implements the multiplexing method of the invention. Although the invention may be embodied in many ways, certain unifying structures and aspects of operation exist. As to structure, each optical selector includes an electromagnet, an armature, and an optical device, or equivalent components. The electromagnet and the armature are mounted on a base. The electromagnet is fixed in place, while the armature is mounted with a hinge or similar pivot. The optical device is mounted in a fixed position on the armature.

The electromagnets are actuated by turning on an external power source. Actuating an electromagnet produces electromagnetic forces from a first, nearby magnetic pole of the actuated electromagnet. These electromagnetic forces move the armature, thereby moving the optical device relative to a light beam.

The optical device is mounted on the armature with the device's main optical axis normal to a plane defined by the armature's motion. For instance, a planar mirror is mounted on the armature with the mirror plane parallel to the armature plane of motion. So mounted, the optical device travels through the light beam at a substantially constant angle of incidence and at substantially the same location within the beam, thereby minimizing the risk of misdirecting the light beam.

Various embodiments may employ a wide variety of optical devices, including mirrors, lenses, filters, gratings, polarizing devices, or combinations thereof. As used herein, "optical device" includes any device having an optical surface.

Each embodiment includes an electromagnet, but the electromagnet may or may not be part of an electromagnetic relay. If the armature is not in substantial electromagnetic communication with the electromagnet's second, more distant magnetic pole, then the embodiment contains a simple electromagnet. On the other hand, if the armature is in electromagnetic communication with the distant magnetic pole, then the embodiment by definition includes an electromagnetic relay. A relay is formed when the polarity of the distant magnetic pole is imparted to a portion of the armature, so that the armature and the nearby pole have opposite polarity if the electromagnet is actuated. An armature thus connected to an electromagnet in a relay is therefore urged more forcefully toward the electromagnet than is an armature not so connected.

In addition to electromagnetic forces, the armature may also be subject to a force exerted by a spring or similar urging device. For instance, the optical selector may be configured so that a leaf spring urges the armature into a position away from the nearby pole if the electromagnet is not actuated. In this embodiment, the force from the electromagnet overcomes the spring and urges the armature toward the nearby pole if the electromagnet is actuated. The optical device mounted on the armature may thus be positioned to engage the light beam when the electromagnet is actuated and to disengage from the beam when the electromagnet is not actuated.

Multiple optical selectors—each having its own electromagnet, armature, and optical device—may be mounted to a common frame to form a variety of multiplexing devices. In a configuration useful in a dentist's office, for instance, a laser beam enters a region occupied by four optical selectors. The selectors, whose optical devices are mirrors, are mounted in a line so that the mirrors may only engage the laser beam in an active position one at a time. As the first mirror engages the laser beam, the reflected beam is directed to a first output port; a second mirror reflects the laser beam toward a second output port, and so on.

By selectively actuating one of the four electromagnets, and thereby moving the corresponding armature to bring the mirror into the laser beam's path, a user may switch the laser beam from one output port to another. Each output port leads to a fiber optic cable, which in turn is capable of carrying a laser beam to a given operatory. Thus, it becomes unnecessary to roll a laser generator on a cart from operatory to operatory. Instead, a simple flip of a switch or press on a button makes the laser beam available in a selected operatory.

As a fail-safe measure, each optical selector contains a spring that urges the armature, and hence the mirror, toward a passive position. Thus, if the power to any or all of the electromagnets fails, the laser beam is directed past all four optical selectors to a known safe location.

These and other features and advantages of the present invention will become more fully apparent through the following description and appended claims taken in conjunction with the accompanying drawings.

BRIEF DESCRIPTION OF THE DRAWINGS

In order to more fully appreciate the manner in which the above-recited and other advantages and features of the invention are obtained, a more particular description of the invention summarized above will be rendered by reference to the appended drawings. Understanding that these drawings only provide illustrate typical embodiments of the invention, and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
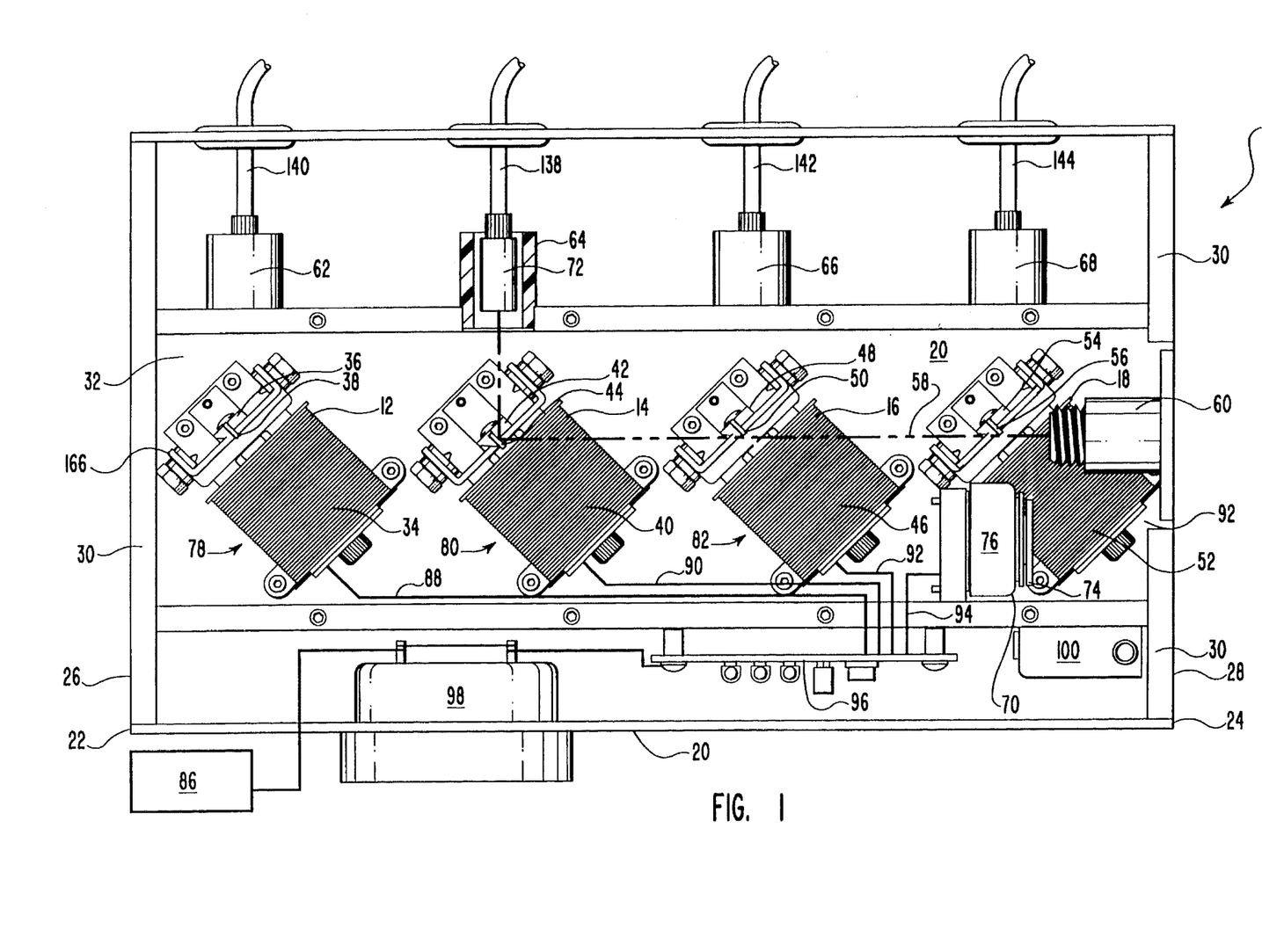
FIG. 1 is a top plan view of a presently preferred embodiment of the invention, including four optical selectors mounted in line on a frame for switching a laser beam between four output ports.

Reference is now made to the figures wherein like parts are referred to by like numerals. One preferred embodiment of the present invention, depicted in FIG. 1, is generally designated 10. The configuration shown in FIG. 1 includes four optical selectors, 12, 14, 16, and 18, that are mounted to a frame 20. The frame 20 is generally C-shaped, with two ends 22, 24. Each end 22, 24 is covered by an end plate, 26 and 28, respectively. During operation of the apparatus, a cover plate (not shown) is normally positioned on top of the frame 20 on mount plates 30, thereby enclosing the optical selectors 12, 14, 16, 18 in a chamber 32.

Optical selector 12, like the other three optical selectors, includes an electromagnet 34, an armature 36, and an optical device 38. Each of the optical devices 38, 44, 50, 56 shown in FIG. 1 is a mirror capable of reflecting substantially all of a laser beam 58 directed at it. However, those of skill in the art will appreciate that a wide variety of other optical devices, such as lenses, filters, gratings, and partially reflective mirrors, also lie within the scope of the present invention.

A laser input port 60, four laser output ports 62, 64, 66, 68 and a shutter 70 are also mounted to the frame 20. As further explained below, the input port 60, optical selectors 12, 14, 16, 18, and output ports 62, 64, 66, 68 are positioned relative to one another such that any one of the mirrors 38, 44, 50, 56 may engage the laser beam 58 emanating from the input port 60, thereby directing the laser beam 58 to the corresponding output port 62, 64, 66, 68, respectively. FIG. 1 illustrates engagement of the laser beam 58 by the mirror 44 on optical selector 14.

The input port 60 may be a standard laser port which places the apparatus 10 in communication with the output of a laser generator. A typical laser generator is a model 5500A manufactured by Ion Laser Technology, Salt Lake City, Utah. Each output port 62, 64, 66, 68 may be a standard laser port suitable for connection to a standard fiber coupler 72. The shutter 70 may be a standard shutter including an ovoid shutter plate 74 rotationally mounted near one end on a servomechanism 76 such that the shutter plate 74 may on demand interrupt the laser beam 58.

Each mirror 38, 44, 50, 56 is mounted on an armature 36, 42, 48, 54, respectively, of an electromagnetic relay (indicated generally at 78, 80, 82, 82, respectively) for motion in a plane parallel to the plane defined by the armature's movement. The armatures 36, 42, 48, 54 move the mirrors 38, 44, 50, 56, respectively, into engagement with the laser beam 58 in response to actuation of the electromagnets 34, 40, 46, 52, respectively, in a manner further described below. The electromagnets 34, 40, 46, 52, in turn, are actuated by electric power that is provided initially by an external electric power source such as a standard power supply 86 fed by a standard wall socket.

The electric power is directed toward selected electromagnets in the group 34, 40, 46, 52 through individual power lines 88, 90, 92, 94 by a controller 96 designed and constructed according to known techniques in the art. A standard power meter 98 is also mounted to the frame 20 so as to be visible when the cover plate (not shown) is installed. A cover interlock 100 normally shuts off the flow of electric power to the apparatus 10 if the cover plate (not shown) of the frame 20 is removed.

Figure 2:
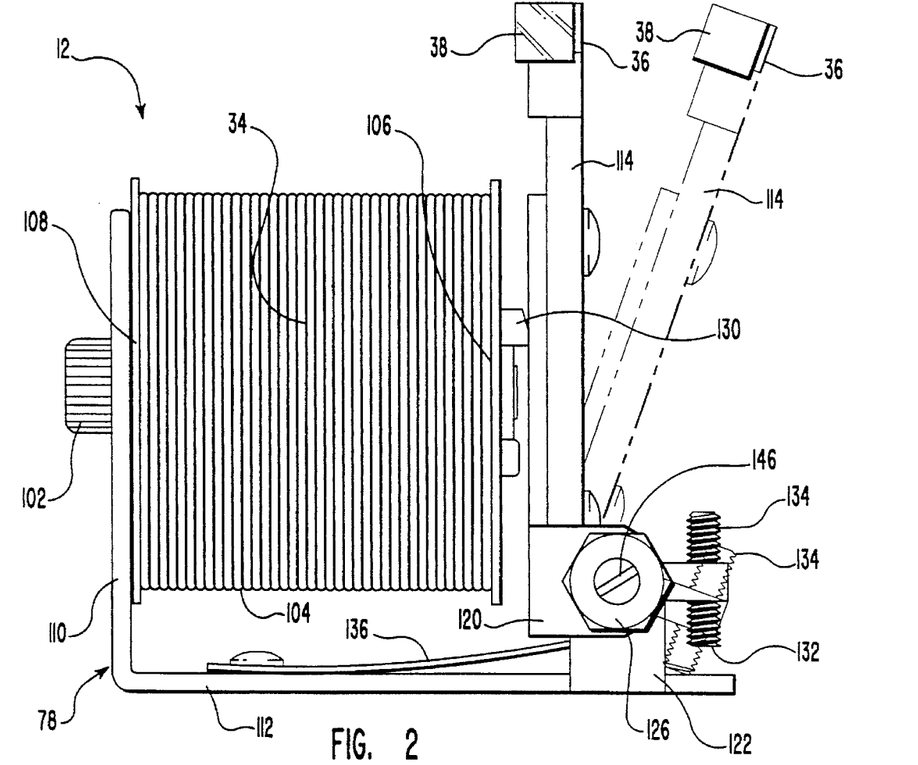
FIG. 2 is a side plan view of an optical selector of FIG. 1 which has, however, been actuated. The optical selector includes an electromagnetic relay in which an armature in the relay is mounted to a base with a hinge and is subject to pressure from a leaf spring.
Figure 3:
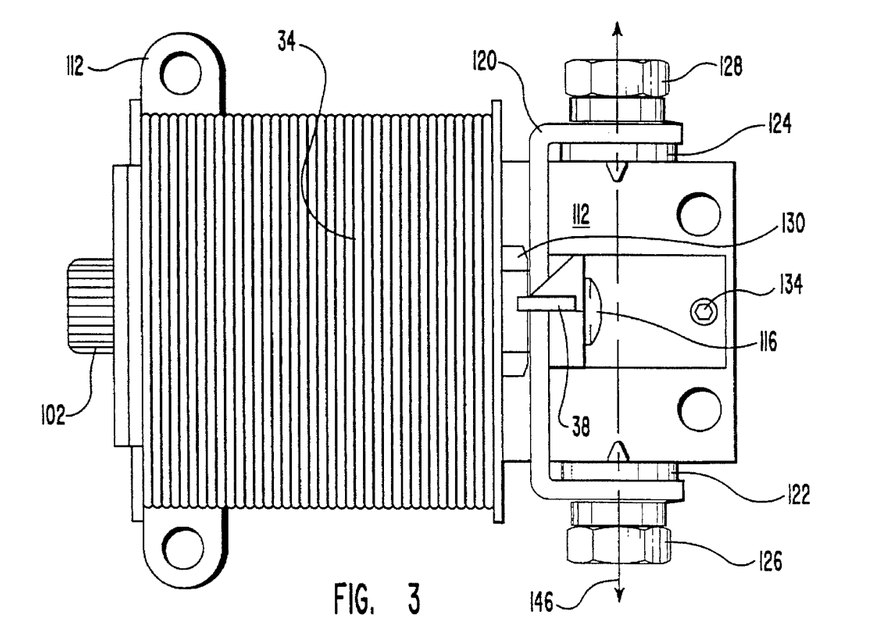
FIG. 3 is a top view of the optical selector embodiment shown in FIG. 2.
Figure 4:
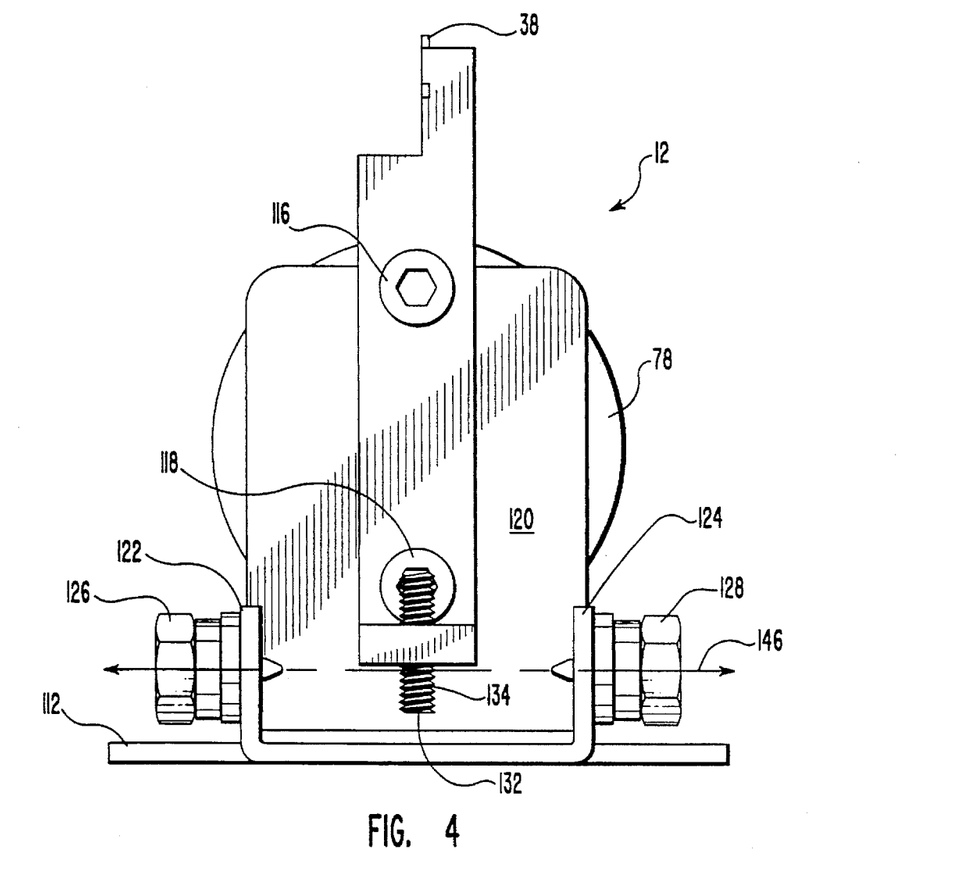
FIG. 4 is an end view of the optical selector embodiment shown in FIG. 2.

FIGS. 2 through 4 illustrate more fully the structure of a presently preferred optical selector 12. FIG. 2 shows a ferrite core 102 wrapped with a coil of wire 104. The coil 104 is in electrical communication with the external power source (86 in FIG. 1) through the power line (88 in FIG. 1) controlled by the controller (96 in FIG. 1). The coil 104 and the core 102 form an electromagnet 34 having two magnetic poles, 106, 108, one pole 106 being near the armature 36, and the other pole 108 being distant from the armature 36. A yoke 110 extending from a base 112 supports the electromagnet 34 near its distant magnetic pole 108. As illustrated in FIG.

1, the base 112, in turn, is mounted on the frame 20.

Referring once more to FIG. 2, the armature 36 is also mounted on the base 112. The armature 36 shown includes an arm 114 secured with bolts 116, 118 (shown best in FIG. 4) to a hinge plate 120, which is in turn secured to two base flanges 122, 124 with hinge pins 126, 128. However, those of skill in the art will appreciate that other armature and armature mount configurations also lie within the scope of the present invention.

As mounted, the armature 36 may pivot between a rest position and a responsive position, as indicated in FIG. 2 by the phantom armature 36 and the solid armature 36, respectively. Motion beyond the responsive position is prevented because the armature 36 presses against a stud 130 protruding from the electromagnet 34. Motion beyond the rest position is prevented because one end 132 of a set screw 134 presses against the base 112. A leaf spring 136 mounted on the base 112 presses against the armature 36, urging the armature 36 toward the rest position (indicated in FIG. 2 by phantom armature 36).

In operation, selected armatures of the group 36, 42, 48, 54 illustrated in FIG. 1 may be moved to direct the laser beam 58 toward different output ports 62, 64, 66, 68, respectively. The mirrors 38, 50, 56 of optical selectors 12, 16, 18 are shown in the passive position, while the mirror 44 of optical selector 14 is in the active position. The laser beam 58 emerging from the input port 60 travels past the passive mirrors 38, 50, 56 because they have been moved out of the beam's path by pressure from their respective leaf springs (best illustrated by leaf spring 136 in FIG. 2).

The armature 42 of optical selector 14, however, has been attracted by the actuated electromagnet 40, thereby moving the mirror 44 into a position which engages the laser beam 58. The laser beam 58 is reflected by the mirror 44 into the selected output port 64. From the port 64, the laser beam 58 travels into and along a standard fiber optic cable 138. The distal end of the cable 138 (not shown) is attached to a second input port or other suitable fixture (not shown) in the operatory. Other fiber optic cables 140, 142, 144 lead to other operatories.

Thus, the laser beam 58 may be made available to different operatories by engaging the laser beam 58 with different mirrors in the group 38, 44, 50, 56 inside the apparatus 10. Only one laser generator is required, rather than one per operatory. Moreover, that single laser generator need not be carted from room to room, because the beam 58 may be switched from one operatory to another simply by actuating the appropriate optical selector 12, 14, 16, or 18 in the apparatus 10. Additionally, the beam 58 may be directed to multiple operatories by splitting the beam 58 rather than switching it. Because portability is not a fundamental design consideration, the laser generator may also be constructed using larger but more cost-effective designs.

The optical device is mounted on the armature to travel in parallel planar fashion to the plane of armature movement. In the embodiment shown in FIG. 2, this is accomplished by mounting the planar mirror 38 normal to the armature's axis of rotation 146. The axis of rotation 146 is defined by the hinge pins 126, 128, as best illustrated in FIGS. 3 and 4.

Two opposing forces may act on the armature 36 of FIG. 2 to rotate it between the rest position and the responsive position. In the embodiment shown, these forces are exerted by the leaf spring 136 and the attractive electromagnet 34, but those of skill in the art will appreciate that other urging means such as gravity, electromagnetic repulsion, or elasticity also lie within the scope of the present invention.

The leaf spring 136 presses continually against the armature 36, thereby urging the armature 36 toward the rest position (indicated by phantom armature 36 in FIG. 2). The electromagnetic force, by contrast, is exerted on the armature 36 only if the electromagnet 34 is supplied with electric power, by the controller (96 in FIG. 1) or otherwise.

The electromagnetic force may arise from the electromagnet 34 in two different ways. The electromagnet 34 may be a simple electromagnet 34, which exerts a force on the armature 36 only through the nearby magnetic pole 106. The nearby magnetic pole 106 acting alone may thus exert an attractive force on the armature 36 that is sufficient to overcome the opposing force of the spring 136 and thereby move the armature 36 into the responsive position (indicated by solid armature 36 in FIG. 2).

It is presently preferred, however, that the electromagnetic force of the nearby magnetic pole 106 be augmented by forming an electromagnetic relay (indicated generally at 78) with the armature 36 and the electromagnet 34. Thus, the yoke 110 and base 112 are preferably composed of iron or other materials capable of carrying magnetic flux from the distant magnetic pole 108 to at least a portion of the armature 36, which thereby becomes magnetically polarized.

An armature 36 in electromagnetic communication with the distant magnetic pole 108 in this manner has opposite polarity than the nearby pole 106 if the electromagnet 34 is actuated. Because opposite polarities attract one another, the armature 36 is attracted more forcefully toward the nearby pole 106 than it would be in the absence of such augmentation. Thus, less power is needed to overcome the opposing force of the spring 136.

In the embodiment herein illustrated, the armature's rest position (indicated by the phantom armature 36 in FIG. 2) corresponds to the optical surface's passive position. However, in alternative embodiments the optical selectors 12, 14, 16, 18 may be positioned differently relative to the light beam input port 60, such that the armature's rest position corresponds to the optical surface's active position. In addition, embodiments in which the rest position is nearer the electromagnet (34 in FIG. 2) than the responsive position also lie within the scope of the present invention. In one such an alternative embodiment, the actuated electromagnet 34 repels the armature 36 and a spring 136 or other urging means urges the armature 36 toward the electromagnet 34, in contrast to the embodiment shown in FIG. 2. All such alternatives lie within the scope of the present invention.

FIG. 3 is a top view of the embodiment shown in FIG. 2, further illustrating the optical selector's base 112. FIG. 3 also illustrates how the mirror 38 is mounted normal to the armature's axis of rotation 146 in order to remain within a plane having a substantially constant angle and location while engaging the laser beam (58 in FIG. 1). FIG. 4 is an end view of the embodiment shown in FIG. 2, further illustrating the armature's connection to the base 112 and hence to the electromagnetic relay 78 within the optical selector 12.

Figure 5:
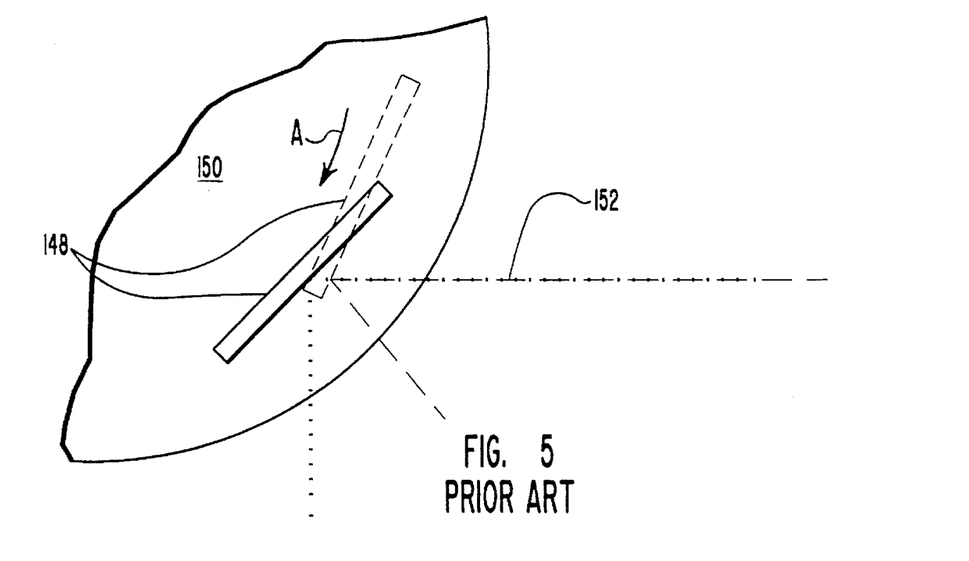
FIG. 5 is a top view of a prior art multiplexing apparatus which employs a mirror mounted on a rotary stage, illustrating one mirror position with phantom lines and a second mirror position with solid lines.
Figure 6:
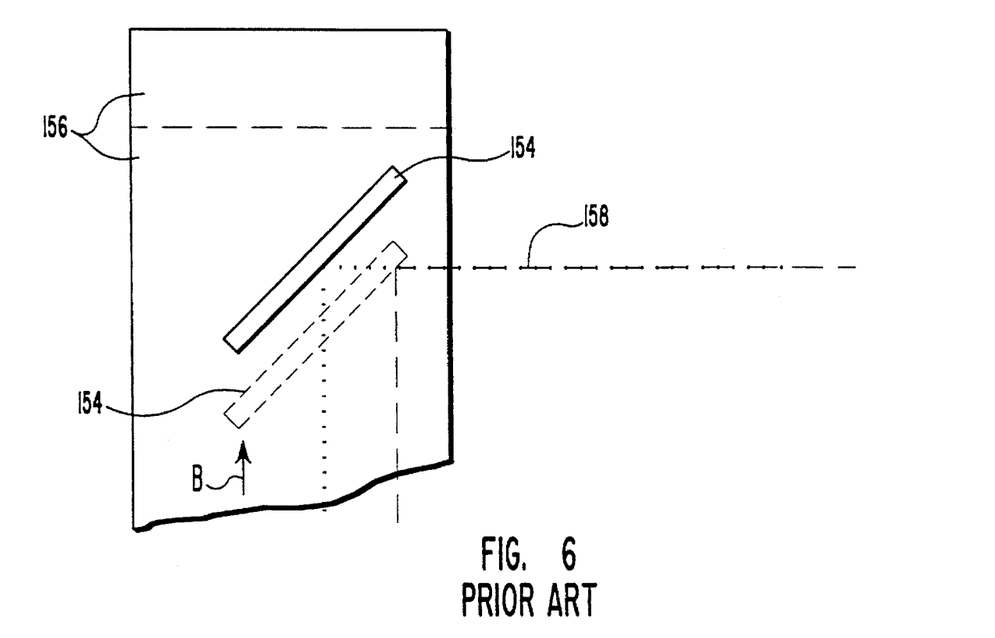
FIG. 6 is a top view of a prior art multiplexing apparatus which employs a mirror mounted on a translation stage, illustrating one mirror position with phantom lines and a second mirror position with solid lines.
Figure 7:
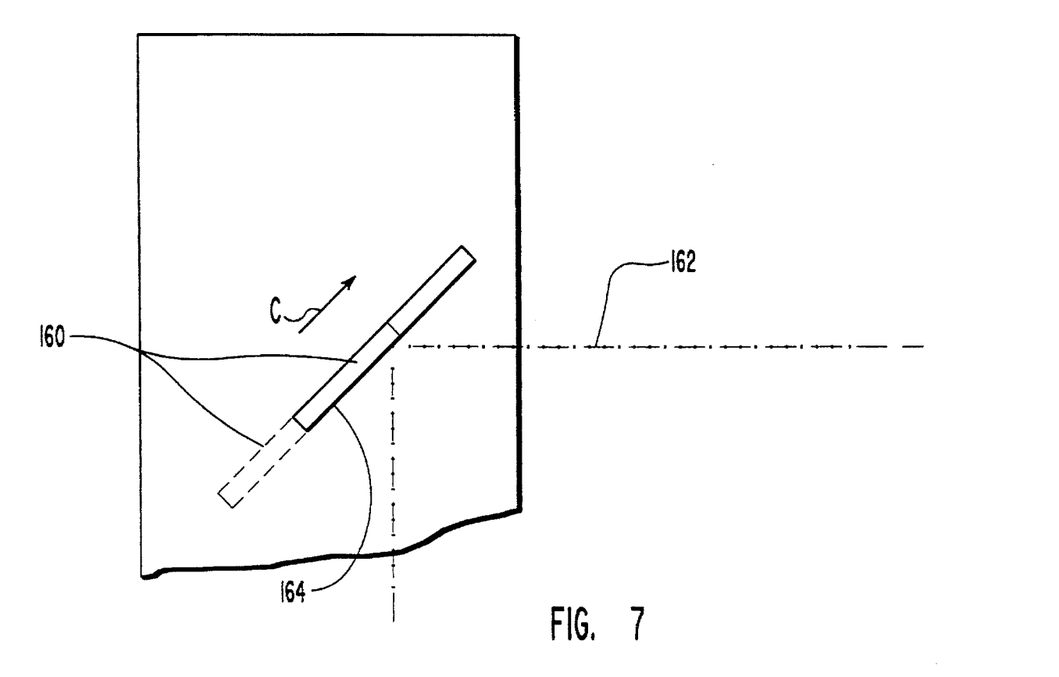
FIG. 7 is a top plan view of an embodiment of the present invention which employs a mirror mounted to move in a plane parallel to the plane containing the mirror's optical surface, illustrating one mirror position with phantom lines and a second mirror position with solid lines.

As explained above, the optical device is mounted on the armature to travel through the light beam at a substantially constant angle of incidence and a substantially constant distance from the beam's origin, thereby minimizing the risk of misdirecting the light beam. FIGS. 5, 6, and 7 illustrate the importance of the present invention's apparatus and method for engaging a light beam with an optical surface while maintaining the optical surface's angle and location relative to the light beam.

FIGS. 5 and 6 illustrate conventional designs which do not maintain a proper angle and location as an optical surface engages a light beam. The optical surface 148 shown in FIG. 5 is a mirror mounted on a conventional rotating stage 150, which travels in the direction indicated generally by Arrow A. Because the mirror 148 rotates while engaging a light beam 152, the beam 152 is reflected in various directions, two of which are shown. Similar problems with the light beam 152 may arise if the optical surface 148 is a lens or other device rather than a planar mirror.

The optical surface 154 shown in FIG. 6 is a mirror mounted on a conventional translation stage 156 which travels generally in the direction indicated by Arrow B. Unlike the rotating mirror 148 shown in FIG. 5, the mirror 154 in FIG. 6 maintains a proper angle while engaging a light beam 158. However, the distance from the beam's origin to the mirror 154 changes while the mirror 154 engages the light beam 158, so the light beam 158 is improperly directed to a variety of locations, two of which are illustrated.

By contrast, FIG. 7 illustrates the manner in which the present invention maintains both the positive (non-zero) angle of incidence and the location of a mirror or other optical device 160 during engagement with a light beam 162. As shown, the optically active plane 164 of the optical device 160 travels substantially parallel the plane of motion (indicated by Arrow C) while engaging the light beam 162. Because the angle and location of the optical surface 164 are substantially constant during engagement with the light beam 162, the present invention does not misdirect the light beam 162 during the transition between passive and active optical surface positions.

In the case of the mirror 160 shown in FIG. 7 or another optical device 160 having a substantially flat optical surface 164, the preferred plane of travel is parallel to that flat surface 164. Thus, the mirror 160 travels, as indicated by Arrow C, substantially in the plane defined by the mirror's reflective optical surface 164.

Some lenses or other optical devices lack a substantially flat optical surface. In such cases, the plane of travel may be defined as the plane in which a light beam can travel unbent through a transparent copy of the optical device, or the plane normal to the main optical axis of the optical device. In either case, the plane of travel preferably minimizes the inaccuracies caused by motion of the optical device while engaging the light beam.

Referring once more to FIG. 1, it will now be appreciated that the optical selectors 12, 14, 16, 18 may be positioned to provide a fail-safe apparatus and method. If any optical selector of the group 12, 14, 16, 18 loses power, that selector's electromagnet 34, 40, 46, 52, respectively, exerts no force on the corresponding armature 36, 42, 48, 54, respectively. In the absence of any opposing force from electromagnet 34, for instance, the spring 136, as shown in FIG. 2, urges the armature 36 toward a rest position away from the electromagnet 34. referring once more to FIG. 1, the armature 36 is positioned relative to the light beam input port 60 such that the armature's rest position holds the mirror 38 in a passive position outside the light beam 58. Thus, in the event of a power failure to the electromagnet 34, the light beam 58 is directed past the mirror 38 toward a known safe location 166.

In summary, the present invention provides a cost-effective and accurate apparatus and method for engaging and disengaging an optical surface with a light beam. The apparatus permits use of a single laser generator to serve multiple operatories, at a cost substantially lower than the cost of multiple generators or equivalent portable generators. By eliminating the need to cart a laser generator from room to room, the apparatus also provides significant time savings and eliminates the inconvenience of having a laser generator in the operatory.

The present invention also provides a multiplexing apparatus and method that does not rely on stepper motors, complicated mechanical linkages, sophisticated electronics, or other intricate components to position the optical surface. Instead, rugged, reliable, and accurate electromagnetic relays are employed. The leaf springs, hinges, and similar simple mechanical parts used in the apparatus are likewise less expensive and more reliable than the complex positioning mechanisms used in conventional systems.

Another advantage of the present invention is that it does not misdirect the light beam during the transition between passive and active optical surface positions. Because the mirror is mounted to travel in the armature's plane of movement, the laser beam is intercepted at a substantially constant angle and location. Thus, the engaged laser beam is always reflected toward the output port, even if the mirror is en route between the passive and active positions.

In addition, the present invention provides a fail-safe apparatus and method that reliably positions the optical surface in a safe position in the event of a power failure. If the optical selector loses power, the leaf spring urges the mirror toward the passive position, out of the laser beam's path.

It should be appreciated that the apparatus of the present invention is capable of being incorporated in the form of a variety of embodiments, only a preferred embodiment has been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by patent is:

1. A multiplexing apparatus comprising:
    a base;
    a rigid armature pivotally secured to said base and capable of pivoting form a rest position into a responsive position in response to a force; and
    an optical device fixedly secured to said armature and capable of engaging and disengaging a light beam as said armature moves between said responsive position and said rest position, said optical device being located at a positive angle of incidence with respect to the light beam in one of said rest position and said responsive position, said optical device being secured to said armature at an angle relative to the light beam and said armature being positioned relative to the light beam to substantially maintain said angle of incidence as said optical device disengages and engages the light beam as said armature pivots between said rest position and said responsive position.

2. The multiplexing apparatus of claim 1, wherein the light beam has an origin and said optical device is capable of engaging the light beam at a substantially constant distance from said light beam's origin as said armature pivots between said rest position and said responsive position.

3. The multiplexing apparatus of claim 1, wherein said optical device comprises a mirror.

4. The multiplexing apparatus of claim 1, wherein said optical device has a substantially planar optical surface.

5. The multiplexing apparatus of claim 4, wherein said armature pivots about an axis of rotation that is normal to said planar optical surface.

6. The multiplexing apparatus of claim 1, further comprising a biasing means capable of urging said armature toward said rest position.

7. The multiplexing apparatus of claim 6, wherein said biasing means comprises a leaf spring.

8. The multiplexing apparatus of claim 1, further comprising an electromagnet fixedly mounted on said base and capable of producing an electromagnetic force for pivoting said armature into said responsive position.

9. A multiplexing apparatus comprising:

a base;

a rigid armature pivotally secured to said base and capable of pivoting from a rest position into a responsive position in response to a force;

an electromagnet fixedly mounted on said base and capable of producing an electromagnetic force for pivoting said armature into said responsive position;

a biasing means for urging said armature toward said rest position; and an optical device fixedly secured to said armature and capable of engaging and disengaging a light beam as said armature moves between said responsive position and said rest position, said optical device being located at a positive angle of incidence with respect to the light beam in one of said rest position and said responsive position, said optical device being secured to said armature at an angle relative to the light beam and said armature being positioned relative to the light beam to substantially maintain said angle of incidence as said optical device disengages and engages the light beam as said armature pivots between said rest position and said responsive position.

10. The multiplexing apparatus of claim 9, wherein said armature and said electromagnet form part of an electromagnetic relay.

11. The multiplexing apparatus of claim 9, wherein said optical device comprises a mirror.

12. The multiplexing apparatus of claim 9, wherein said biasing means comprises a leaf spring.

13. The multiplexing apparatus of claim 9, wherein said armature is pivotally secured to said base by a pin hinge.

14. The multiplexing apparatus of claim 9, wherein said armature includes a set screw and an end of said set screw abuts said base if said armature is in said rest position.

15. The multiplexing apparatus of claim 9, wherein said optical device engages the light beam if said armature is in said responsive position.

* * * * *